(12) United States Patent
Kim et al.

(10) Patent No.: US 7,704,649 B2
(45) Date of Patent: Apr. 27, 2010

(54) METHOD OF FABRICATING COLOR FILTER

(75) Inventors: Sung-woong Kim, Suwon-si (KR); Seung-joo Shin, Seoul (KR); Seong-jin Kim, Seongnam-si (KR); Kye-si Kwon, Seoul (KR); Sang-il Kim, Suwon-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 385 days.

(21) Appl. No.: 11/453,141

(22) Filed: Jun. 15, 2006

(65) Prior Publication Data

US 2007/0184362 A1    Aug. 9, 2007

(30) Foreign Application Priority Data

Feb. 4, 2006    (KR) .................... 10-2006-0010921

(51) Int. Cl.
*G02B 5/20*    (2006.01)

(52) U.S. Cl. ..................... 430/7; 347/107; 427/335

(58) Field of Classification Search ............... None
See application file for complete search history.

(56) References Cited

U.S. PATENT DOCUMENTS

| | | | |
|---|---|---|---|
| 5,989,757 A | 11/1999 | Satoi | |
| 6,147,347 A * | 11/2000 | Hirabayashi et al. | 250/288 |
| 6,277,529 B1 | 8/2001 | Marumoto et al. | |
| 6,630,274 B1 | 10/2003 | Kiguchi et al. | |
| 2003/0108804 A1 | 6/2003 | Cheng et al. | |
| 2004/0115339 A1 * | 6/2004 | Ito | 427/66 |
| 2004/0131955 A1 | 7/2004 | Yen | |
| 2005/0276910 A1 | 12/2005 | Gupta | |
| 2006/0134316 A1 * | 6/2006 | Fitch | 427/66 |

FOREIGN PATENT DOCUMENTS

| | | |
|---|---|---|
| EP | 0895101 | 2/1999 |
| EP | 1122560 | 8/2001 |
| JP | 54-48238 | 4/1979 |
| JP | 60-52347 | 3/1985 |
| JP | 5-045509 A * | 2/1993 |
| JP | 06-347634 | 12/1994 |
| JP | 7-102176 A * | 4/1995 |

OTHER PUBLICATIONS

Computer-generated translation of JP 5-045509 (Feb. 1993).*
Computer-generated translation of JP 7-102176 (Apr. 1995).*
European Search Report dated May 30, 2007 issued in European Patent Application No. 06252592.8.
European Search Report dated Mar. 5, 2007 issued in EP 06252595.
Seog-soon Baek et al.; Copending application entitled "Apparatus to Fabricate Color Filter and Method Thereof", Filed Jun. 15, 2006, 15 pages of specification, 3 sheets of drawings, 2 pages of executed Declaration/Power of Attorney.

* cited by examiner

*Primary Examiner*—John A. McPherson
(74) *Attorney, Agent, or Firm*—Stanzione & Kim LLP

(57) ABSTRACT

A method of manufacturing a color filter forming a black matrix on a substrate, the black matrix defining a plurality of pixels, forming liquid ink layers within the pixels and drying the liquid ink layers, penetrating solvent vapor into surfaces of the dried liquid ink layers to form ink layers have mobile surfaces, and drying the ink layers having the mobile surfaces.

17 Claims, 5 Drawing Sheets

METHOD OF FABRICATING COLOR FILTER

CROSS-REFERENCE TO RELATED APPLICATIONS

This application claims priority under 35 U.S.C. §110(a) from Korean Patent Application No. 10-2006-0010921, filed on Feb. 4, 2006, in the Korean Intellectual Property Office, the disclosure of which is incorporated herein in its entirety by reference.

BACKGROUND OF THE INVENTION

1. Field of the Invention

The present general inventive concept relates to a method of fabricating a color filter, and more particularly, a method of fabricating a color filter by which color characteristics can be improved.

2. Description of the Related Art

Until recently, cathode ray tube (CRT) monitors have been usually used to display information from TVs (televisions) and computers. However, flat panel displays, such as liquid crystal displays (LCDs), plasma display panels (PDPs), electro-luminescence (EL) displays, light emitting diodes (LEDs), and field emission displays (FEDs), are now being used with an increase in sizes of screens. LCDs among these flat panel displays are widely used as desktop computer monitors, lap-top computer monitors, etc., because the LCDs have low power consumption.

The LCDs include a color filter that forms images of desired colors by transmitting white light modulated by a liquid crystal layer. The color filter includes an arrangement of a plurality of red (R), green (G), and blue (B) pixels formed on a transparent substrate. The color filter has been fabricated using conventional methods including a dyeing method, a pigment dispersion method, a printing method, an electrodeposition method, etc. However, these conventional methods include a repetition of predetermined processes for pixels of each color, thus degrading process efficiency and increasing fabrication costs.

Accordingly, a conventional method of fabricating a color filter using an inkjet printing technique has been recently proposed, which is performed more simply and cost-effectively as compared to other conventional methods. In this method, ink drops of predetermined colors, such as R, G, and B, are discharged into pixels on a substrate through nozzles of an inkjet head, thereby forming a color filter.

FIGS. 1A and 1B are views illustrating a conventional method of fabricating a color filter using a conventional inkjet printing technique. Referring to FIG. 1A, when ink droplets of predetermined colors are discharged from nozzles of an inkjet head (not illustrated) into pixels defined by a black matrix 20 on a substrate 10, the pixels are filled with liquid ink layers 30. Referring to FIG. 1B, when the liquid ink layers 30 are dried, solid ink layers 31 of the predetermined colors are formed within the pixels. However, while the liquid ink layers 30 are drying, a variety of mass flows occur within the pixels according to properties of the black matrix 20, characteristics of the ink, a drying speed of the ink, etc. Accordingly, a thickness of each of the solid ink layers 31 within the pixels is very non-uniform, as illustrated in FIG. 1B. Additionally, drying conditions of the pixels of the color filter are different according to their locations on the substrate, so that the solid ink layers 31 have different shapes from one another. Due to the non-uniform thicknesses of the solid ink layers 31 within the pixels, light may leak from the pixels, or a blurry image may be generated. Consequently, color characteristics of the color filter are degraded.

SUMMARY OF THE INVENTION

The present general inventive concept provides a method of fabricating a color filter by which the color characteristics of the color filter can be improved by making the thicknesses of ink layers formed within pixels uniform.

Additional aspects and advantages of the present general inventive concept will be set forth in part in the description which follows and, in part, will be obvious from the description, or may be learned by practice of the general inventive concept.

The foregoing and/or other aspects and utilities of the present general inventive concept may be achieved by providing a method of manufacturing a color filter, including forming a black matrix on a substrate, the black matrix defining a plurality of pixels, forming liquid ink layers within the pixels and drying the liquid ink layers, penetrating a solvent vapor into surfaces of the dried liquid ink layers to form ink layers having mobile surfaces, and drying the ink layers having the mobile surfaces.

The penetrating of the solvent vapor into the surfaces of the dried liquid ink layers may include subjecting the dried ink layers to the solvent vapor within a chamber filled with the solvent vapor for a predetermined period of time.

The solvent of the solvent vapor may include a material in which the dried ink layers are soluble. The material of the solvent may have an affinity for the black matrix. A surface tension of the solvent may be in a range of about 0.01N/m to about 0.08N/m.

The solvent may be at least one member selected from the group consisting of di(propylene glycol) methyl ether acetate (DPMA), propylene glycol monomethyl ether acetate (PG-MEA), ethyle acetate, and acetone.

The forming of the black matrix on the substrate may include forming a light shade layer on an upper surface of the substrate to have a predetermined thickness, and patterning the light shade layer to define the plurality of pixels on the substrate. The liquid ink layers may be formed within the pixels using an inkjet printing technique.

The black matrix may be formed to have a height of about 1.5 μm on the substrate. The black matrix may be formed to have a width of about 30 μm on the substrate.

The foregoing and/or other aspects and utilities of the present general inventive concept may also be achieved by providing a method of manufacturing a color filter, including injecting ink into pixels of a matrix, drying the ink in the pixels, exposing surfaces of the dried ink to a solvent vapor to mobilize and normalize the surfaces of the dried ink, and drying the ink having the normalized surfaces to form ink layers having uniform thicknesses. The injecting of the ink may include injecting the ink into the pixels of the matrix using a thermal or piezoelectric ink ejecting apparatus.

The foregoing and/or other aspects and utilities of the present general inventive concept may also be achieved by providing a method of manufacturing a color filter, including penetrating a solvent vapor through surfaces of dried ink layers located in pixels of a substrate to resolve the surfaces of the dried ink layers, and drying the ink layers having the resolved surfaces to form ink layers having uniform thicknesses in the pixels.

The foregoing and/or other aspects and utilities of the present general inventive concept may also be achieved by providing a method of manufacturing a color filter, including forming liquid ink layers in pixels of a substrate, drying the liquid ink layers for a first predetermined period of time to form solid ink layers, each solid ink layer having a surface, exposing each of the surfaces to a solvent vapor for a second predetermined period of time to allow each of the surfaces to mobilize and re-arrange such that the surfaces have an identical shape, and drying the solid ink layers having the identically-shaped surfaces for a third predetermined period of time. The first predetermined period of time may be longer than the third predetermined period of time.

The foregoing and/or other aspects and utilities of the present general inventive concept may also be achieved by providing a method of manufacturing a color filter, including injecting ink into pixels of a matrix, drying the ink in the pixels to form solid ink layers, penetrating surfaces of the dried ink with a predetermined material to form mobile solid ink layer surfaces, and applying a predetermined surface tension on the mobilized solid ink layer surfaces to form uniform thicknesses of the solid ink layers. The predetermined material may be a solvent vapor.

The foregoing and/or other aspects and utilities of the present general inventive concept may also be achieved by providing a method of manufacturing a color filter, including injecting ink into pixels of a matrix, drying the ink to form solid ink layers, resolving surfaces of the solid ink layers to become mobile, and re-arranging the mobile surfaces to have identical shapes. The re-arranging may be performed by controlling a pressure or a process time.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1A:
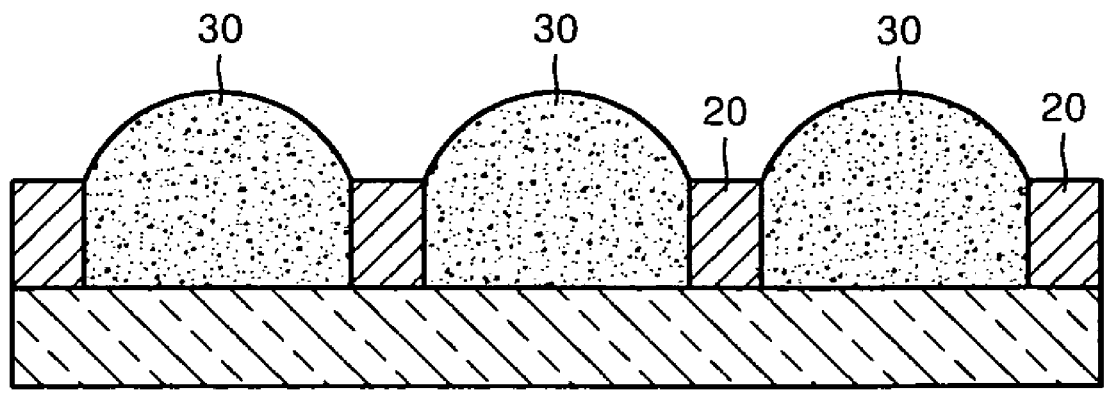
FIGS. 1A and 1B are views illustrating a conventional method of fabricating a color filter.

Reference will now be made in detail to the embodiments of the present general inventive concept, examples of which are illustrated in the accompanying drawings, wherein like reference numerals refer to the like elements throughout. In the drawings, thicknesses of elements are exaggerated for clarity. The embodiments are described below in order to explain the present general inventive concept by referring to the figures.

Figure 2A:
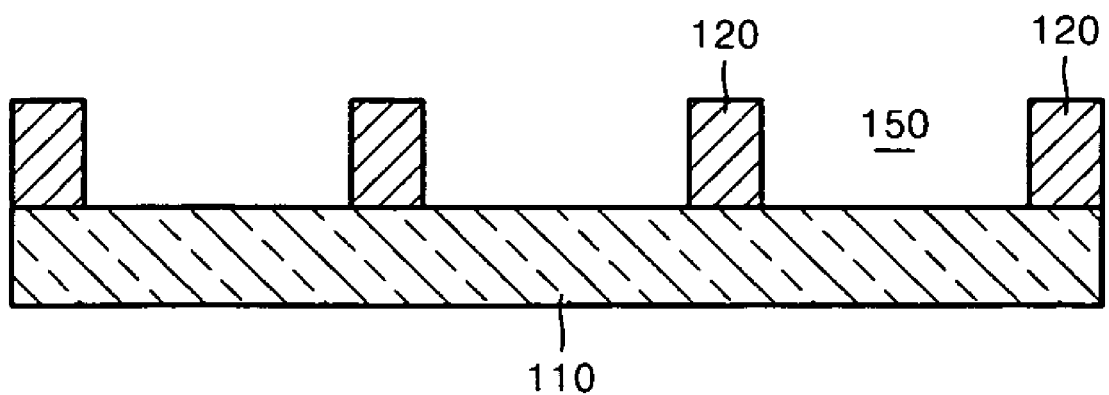
FIGS. 2A through 2F are cross-sectional views illustrating a method of fabricating a color filter, according to an embodiment of the present general inventive concept.

FIGS. 2A through 2D are cross-sectional views illustrating a method of manufacturing a color filter, according to an embodiment of the present general inventive concept. Referring to FIG. 2A, a black matrix 120 is formed on a substrate 110. The substrate 110 is transparent and may be, for example, a glass substrate or a plastic substrate. The black matrix 120 may be formed by forming a light shade layer on the substrate 110 and patterning the light shade layer using a photolithographic process. More specifically, a solution of light shade material is coated on the substrate 110 using a coating method, such as, spin coating, die coating, or dip coating, and then soft baked to thereby form the light shade layer. Thereafter, the light shade layer is exposed to light, developed, and patterned. Then, the patterned light shade layer is hard baked to thereby form the black matrix 120. The black matrix 120 may be about 1.5 μm in height and about 30 μm in width. The thus-formed black matrix 120 defines a plurality of pixels 150 on the substrate 110.

Figure 2B:
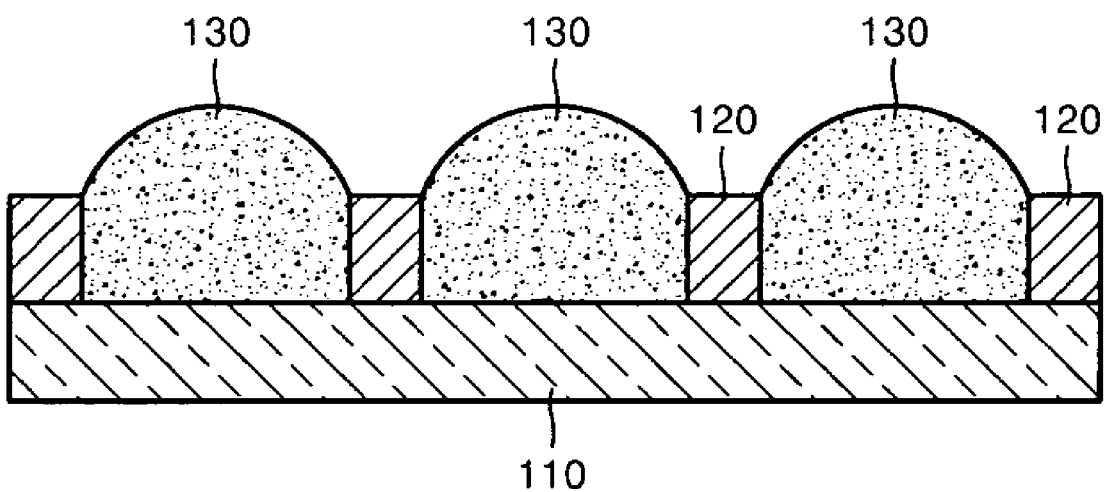

Referring to FIG. 2B, liquid ink layers 130 are formed within the pixels 150. The liquid ink layers 130 may be formed using an inkjet printing method. In this case, the liquid ink layers 130 may be formed by discharging ink droplets of predetermined colors from nozzles of an inkjet head (not illustrated) into the pixels 150.

Figure 2C:
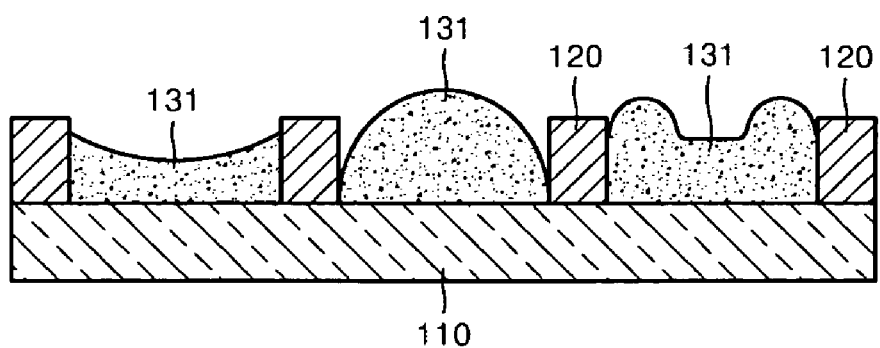

Referring to FIG. 2C, the liquid ink layers 130 filled within the pixels 150 are dried for a predetermined period of time. However, while the liquid ink layers 130 are drying, mass flow occurs within the pixels 150, for example, with a variation in drying speeds of different inks. As a result, solid ink layers 131 having non-uniform thicknesses as illustrated in FIG. 2C are formed within the pixels 150. Additionally, the liquid ink layers 130 are dried under different conditions depending on locations of the pixels 150 on the substrate 110, and as a result, the solid ink layers 131 have different shapes from one another.

Figure 2D:
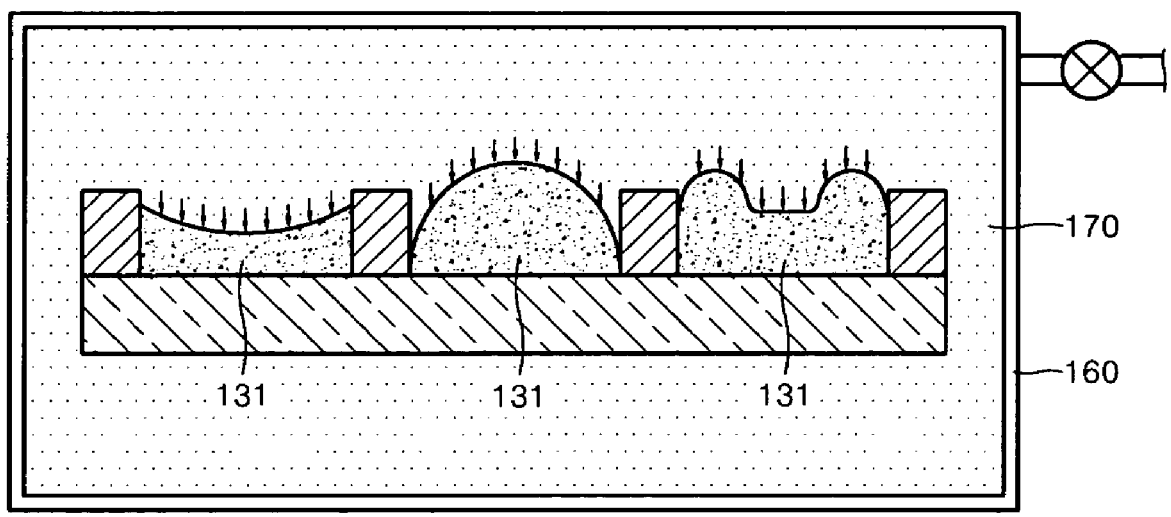

Next, referring to FIG. 2D, the substrate 110 including the solid ink layers 131 having non-uniform thicknesses is placed within a chamber 160 filled with solvent vapor 170 for a predetermined period of time. The solvent of the solvent vapor 170 has a solubility such that the solid ink layers 131 are soluble therein. For example, the solvent may be at least one of di(propylene glycol) methyl ether acetate (DPMA), propylene glycol monomethyl ether acetate (PGMEA), ethyle acetate, and acetone. However, the solvent is not limited to these solvent materials, and therefore may be formed of materials other than the above-described materials.

Figure 2E:
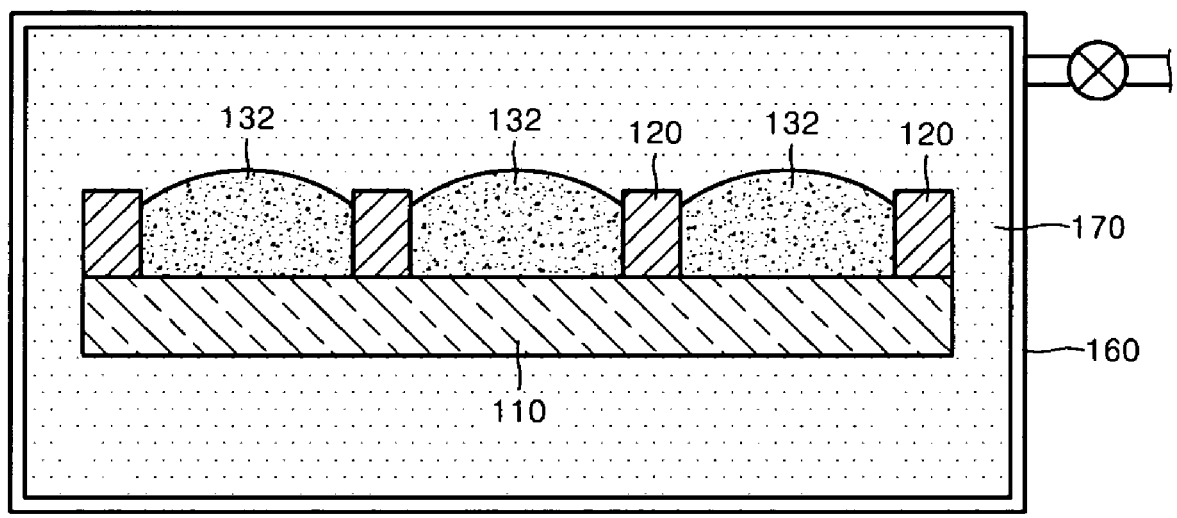

When the substrate 110 including the solid ink layers 131 is placed within the chamber 160 filled with the solvent vapor 170, the solvent vapor 170 penetrates through surfaces of the solid ink layers 131 and resolves the surfaces of the solid ink layers 131. Hence, the surfaces of the solid ink layers 131 become mobile, resulting in solid ink layers 132 having mobile surfaces, as illustrated in FIG. 2E. Then, the mobile surfaces of the solid ink layers 132 are re-arranged into stable shapes (i.e., normalized) by surface energies thereof and gravity, whereby the ink layers 132 having mobile surfaces are formed in identical shapes within the pixels 150, as illustrated in FIG. 2E. The shapes of the ink layers 132 vary according to a surface tension of the solvent. In the present embodiment, a solvent having a surface tension of about 0.01 to about 0.08 N/m may be used. The solvent may be formed of a material having an affinity for the black matrix 120, that is, a material having a small contact angle with respect to the black matrix 120. A pressure, processing time, etc. of the solvent vapor 170 filled within the chamber 160 may be optimized to form the ink layers 132 having identical shapes.

Figure 2F:
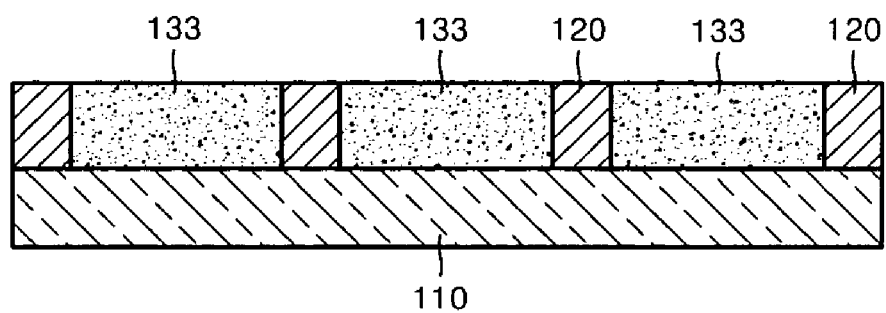

Finally, the ink layers 132 having mobile surfaces and identical shapes are dried for a predetermined period of time. An amount of solvent absorbed by the ink layers 132 is extremely small and the drying is completed in a very short period of time, so that little change in thicknesses of the ink layers 132 due to mass flow occurs during this process. Accordingly, the predetermined period of time during which the liquid ink layers 130 are dried may be longer than the predetermined period of time during which the ink layers 132 having mobile surfaces and identical shapes are dried. Therefore, ink layers 133 having uniform thicknesses are formed within the pixels 151, as illustrated in FIG. 2F.

Figure 1B:
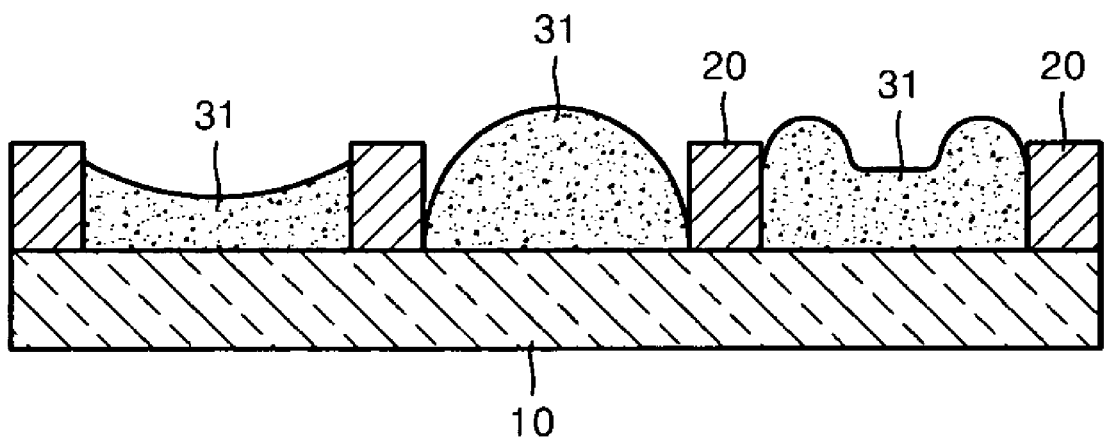
Figure 3:
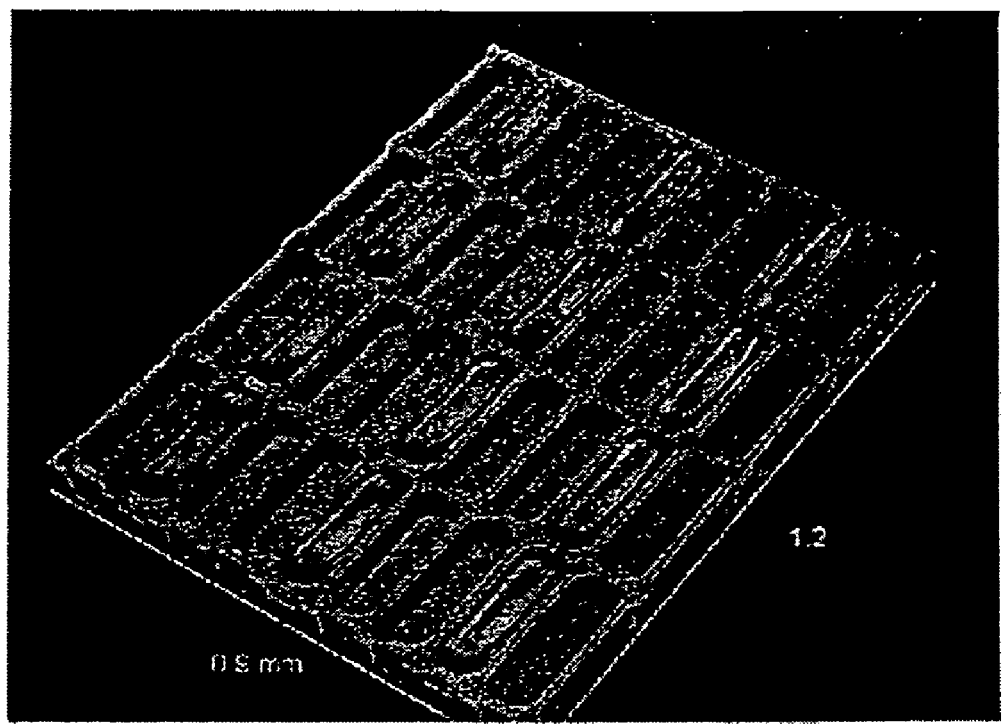
FIG. 3 is a picture of the color filter fabricated using the conventional method of FIGS. 1A and 1B.
Figure 4:
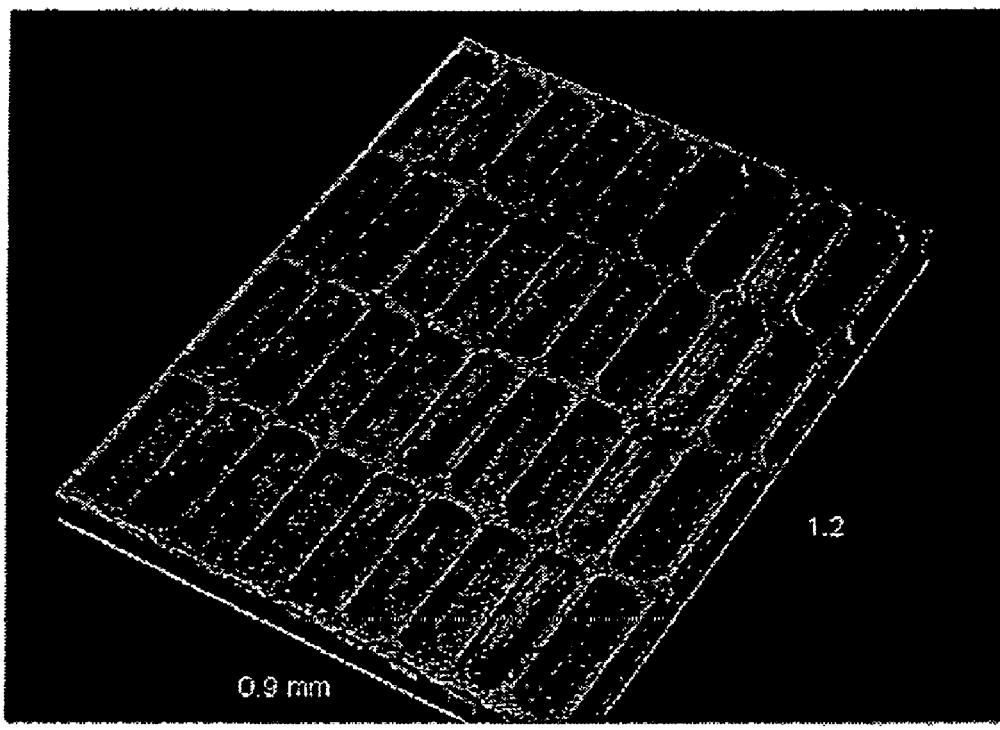
FIG. 4 is a picture of the color filter fabricated using the method illustrated in FIGS. 2A through 2F.

FIG. 3 is a picture of the color filter fabricated using the conventional method of FIGS. 1A and 1B. FIG. 4 is a picture of the color filter fabricated using the method according to the embodiment of the present general inventive concept described and illustrated with reference to FIGS. 2A through 2F. Referring to FIGS. 3 and 4, the color filter fabricated using the conventional method includes ink layers having non-uniform thicknesses formed within pixels, while the color filter fabricated using the method according to the embodiment of the present general inventive concept described and illustrated with reference to FIGS. 2A through 2F includes ink layers having relatively uniform thicknesses formed within pixels.

As described above, in a method of fabricating a color filter according to the present general inventive concept, solvent vapor penetrates through surfaces of dried ink layers and resolves the surfaces, and the resolved ink layers are dried again, whereby ink layers having uniform thicknesses can be formed within pixels of the color filter. Thus, light leakage or image blurring, which are conventional problems, can be reduced, resulting in an improvement of color characteristics of the color filter.

Although a method of fabricating a color filter useable in LCDs according to embodiments of the present general inventive concept has been described and illustrated, this method can be equally applied to fabricating an organic light emitting layer using an inkjet printing technique useable in an organic light emitting diode (OLED), or fabricating an organic semiconductor using an inkjet printing technique useable in an organic thin film transistor (OTFT).

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A method of manufacturing a color filter, comprising:
   forming a black matrix on a substrate, the black matrix defining a plurality of pixels;
   forming liquid ink layers within the pixels and drying the liquid ink layers;
   penetrating a solvent vapor comprising a material in which the dried ink layers are soluble into surfaces of the dried liquid ink layers to form ink layers having mobile surfaces; and
   drying the ink layers having the mobile surfaces,
   wherein the penetrating of the solvent vapor into the surfaces of the dried liquid ink layers comprises:
   subjecting the dried ink layers to the solvent vapor within a chamber filled with the solvent vapor for a predetermined period of time,
   wherein the solvent is at least one member selected from the group consisting of di(propylene glycol) methyl ether acetate (DPMA), propylene glycol monomethyl ether acetate (PGMEA), ethyle acetate, and acetone.

2. The method of claim 1, wherein the material of the solvent has an affinity for the black matrix.

3. The method of claim 1, wherein a surface tension of the solvent is in a range of about 0.01N/m to about 0.08N/m.

4. The method of claim 1, wherein the substrate is transparent.

5. The method of claim 1, wherein the forming of the black matrix on the substrate comprises:
   forming a light shade layer on an upper surface of the substrate to have a predetermined thickness; and
   patterning the light shade layer to define the plurality of pixels on the substrate.

6. The method of claim 1, wherein the liquid ink layers are formed within the pixels using an inkjet printing technique.

7. The method of claim 1, wherein the black matrix is formed to have a height of about 1.5 μm on the substrate.

8. The method of claim 1, wherein the black matrix is formed to have a width of about 30 μm on the substrate.

9. A method of manufacturing a color filter, comprising:
   injecting ink into pixels of a matrix;
   drying the ink in the pixels;
   penetrating surfaces of the dried ink to a solvent vapor comprising a material in which the dried ink layers are soluble to mobilize and normalize the surfaces of the dried ink; and
   drying the ink having the normalized surfaces to form ink layers having uniform thicknesses,
   wherein the solvent is at least one member selected from the group consisting of di(propylene glycol) methyl ether acetate (DPMA), propylene glycol monomethyl ether acetate (PGMEA), ethyle acetate, and acetone.

10. The method of claim 9, wherein the injecting of the ink comprises:
    injecting the ink into the pixels of the matrix using a thermal or piezoelectric ink ejecting apparatus.

11. A method of manufacturing a color filter, comprising:
    penetrating a solvent vapor comprising a material in which the dried ink layers are soluble through surfaces of dried ink layers located in pixels of a substrate to resolve the surfaces of the dried ink layers; and
    drying the ink layers having the resolved surfaces to form ink layers having uniform thicknesses in the pixels,
    wherein the solvent is at least one member selected from the group consisting of di(propylene glycol) methyl ether acetate (DPMA), propylene glycol monomethyl ether acetate (PGMEA), ethyle acetate, and acetone.

12. A method of manufacturing a color filter, comprising:
    forming liquid ink layers in pixels of a substrate;
    drying the liquid ink layers for a first predetermined period of time to form solid ink layers, each solid ink layer having a surface;
    penetrating each of the surfaces to a solvent vapor comprising a material in which the dried ink layers are soluble for a second predetermined period of time to allow each of the surfaces to mobilize and re-arrange such that the surfaces have an identical shape; and
    drying the solid ink layers having the identically-shaped surfaces for a third predetermined period of time
    wherein the solvent is at least one member selected from the group consisting of di(propylene glycol) methyl ether acetate (DPMA), propylene glycol monomethyl ether acetate (PGMEA), ethyle acetate, and acetone.

13. The method of claim 12, wherein the first predetermined period of time is longer than the third predetermined period of time.

14. A method of manufacturing a color filter, comprising:
    injecting ink into pixels of a matrix;
    drying the ink in the pixels to form solid ink layers;
    penetrating surfaces of the dried ink with a predetermined material in which the dried ink layers are soluble, to form mobile solid ink layer surfaces; and applying a predetermined surface tension on the mobilized solid ink layer surfaces to form uniform thicknesses of the solid ink layers, wherein the solvent is at least one member selected from the group consisting of di(propylene glycol) methyl ether acetate (DPMA), propylene glycol monomethyl ether acetate (PGMEA), ethyle acetate, and acetone.

15. The method of claim 14, wherein the predetermined material is a solvent vapor.

16. A method of manufacturing a color filter, comprising:
injecting ink into pixels of a matrix;
drying the ink to form solid ink layers;
penetrating surfaces of the solid ink layers with a predetermined material in which the dried ink layers are soluble to become mobile; and
re-arranging the mobile surfaces to have identical shapes,
wherein the solvent is at least one member selected from the group consisting of di(propylene glycol) methyl ether acetate (DPMA), propylene glycol monomethyl ether acetate (PGMEA), ethyle acetate, and acetone.

17. The method of claim 16, wherein the re-arranging is performed by controlling a pressure or a process time.

* * * * *